US011731582B2

(12) United States Patent
Sakurada et al.

(10) Patent No.: US 11,731,582 B2
(45) Date of Patent: Aug. 22, 2023

(54) VEHICLE CONTROL APPARATUS, VEHICLE CONTROL SYSTEM, AND COMPUTER READABLE RECORDING MEDIUM

(71) Applicants: TOYOTA JIDOSHA KABUSHIKI KAISHA, Toyota (JP); CMC CORPORATION, Nagoya (JP)

(72) Inventors: Shin Sakurada, Toyota (JP); Naoyuki Takada, Toyota (JP); Satoru Sakuma, Nagakute (JP); Yuki Tatsumoto, Nagoya (JP); Yasuhisa Ohta, Toyota (JP); Tetsu Yajima, Nagoya (JP)

(73) Assignees: TOYOTA JIDOSHA KABUSHIKI KAISHA, Toyota (JP); CMC CORPORATION, Nagoya (JP)

( * ) Notice: Subject to any disclaimer, the term of this patent is extended or adjusted under 35 U.S.C. 154(b) by 142 days.

(21) Appl. No.: 17/325,945

(22) Filed: May 20, 2021

(65) Prior Publication Data

US 2021/0370868 A1 Dec. 2, 2021

(30) Foreign Application Priority Data

May 26, 2020 (JP) .................. 2020-091422

(51) Int. Cl.
*B60R 25/04* (2013.01)
*B60R 25/40* (2013.01)
*B60R 25/24* (2013.01)

(52) U.S. Cl.
CPC .............. *B60R 25/04* (2013.01); *B60R 25/24* (2013.01); *B60R 25/40* (2013.01)

(58) Field of Classification Search
None
See application file for complete search history.

(56) References Cited

U.S. PATENT DOCUMENTS

| 6,332,572 B1 * | 12/2001 | Yamamoto ......... G07C 9/00309 235/382 |
| 10,628,643 B2 * | 4/2020 | Wilding ............... G06K 7/0008 |
| 2005/0122208 A1 | 6/2005 | Kondo et al. |
| 2019/0037034 A1 | 1/2019 | Lee et al. |
| 2020/0346619 A1 | 11/2020 | Ishikawa |

FOREIGN PATENT DOCUMENTS

| JP | 2005-170103 A | 6/2005 |
| JP | 2006-44491 A | 2/2006 |
| JP | 2011-074721 A | 4/2011 |
| JP | 2019-131967 A | 8/2019 |

* cited by examiner

*Primary Examiner* — K. Wong
(74) *Attorney, Agent, or Firm* — Sughrue Mion, PLLC

(57) ABSTRACT

A vehicle control apparatus includes a processor including hardware, the processor being configured to: determine whether or not a state of a key device has reached a predetermined state requiring setting of a remote immobilizer function; and transmit, in a case where the state of the key device has reached the predetermined state, a first signal requesting setting of the remote immobilizer function.

17 Claims, 3 Drawing Sheets

VEHICLE CONTROL APPARATUS, VEHICLE CONTROL SYSTEM, AND COMPUTER READABLE RECORDING MEDIUM

The present application claims priority to and incorporates by reference the entire contents of Japanese Patent Application No. 2020-091422 filed in Japan on May 26, 2020.

BACKGROUND

The present disclosure relates to a vehicle control apparatus, a vehicle control system, and a computer readable recording medium.

JP 2011-74721 A discloses a system having a remote immobilizer function in which a management center transmits, in response to a request from a user, a command to a vehicle to disallow start of an engine of the vehicle through mobile communication.

SUMMARY

The remote immobilizer function is more secure against a relay attack than a smart entry function. However, in order to enable the remote immobilizer function, a user needs to make a request to the management center, which brings about complicated work. Note that the relay attack means an illegal act of illegally unlocking a door of a vehicle by providing a radio wave repeater near each of the vehicle and an electronic key, relaying radio waves between the vehicle and the electronic key, and having the vehicle authenticate the electronic key located far away.

There is a need for a vehicle control apparatus, a vehicle control system, and a computer readable recording medium that enable use of a remote immobilizer function without requiring complicated work.

According to one aspect of the present disclosure, there is provided a vehicle control apparatus including a processor including hardware, the processor being configured to: determine whether or not a state of a key device has reached a predetermined state requiring setting of a remote immobilizer function; and transmit, in a case where the state of the key device has reached the predetermined state, a first signal requesting setting of the remote immobilizer function.

DETAILED DESCRIPTION

Hereinafter, a vehicle control system according to an embodiment will be described in detail with reference to the drawings.

First, a configuration of the vehicle control system according to the embodiment will be described with reference to FIG. 1.

The vehicle control system according to the embodiment is for controlling a smart key function and a remote immobilizer function mounted on a vehicle.

Here, the "smart key function" means a function of unlocking and locking a door of the vehicle by performing short-range wireless communication between a key device possessed by a user and the vehicle. The smart key function includes a smart entry function of unlocking or the like of the door by the vehicle authenticating the key device through short-range wireless communication when the user having the key device approaches the vehicle and by the user touching a door knob or the like of the vehicle, and a remote keyless entry function of unlocking or the like of the door by the user operating a switch provided in the key device. In the present embodiment, turning on the smart key function to permit unlocking of the door of the vehicle by short-range wireless communication is expressed as "set (restore) the smart key function", and turning off the smart key function to prohibit unlocking of the door of the vehicle by short-range wireless communication is expressed as "stop (release) the smart key function".

In addition, the "remote immobilizer function" means a function of prohibiting starting of an engine of the vehicle by remote operation from a server device. In the present embodiment, turning on the remote immobilizer function to prohibit starting of the engine of the vehicle is expressed as "set the remote immobilizer function", and turning off the remote immobilizer function to permit starting of the engine of the vehicle is expressed as "stop (release) the remote immobilizer function".

Figure 1:
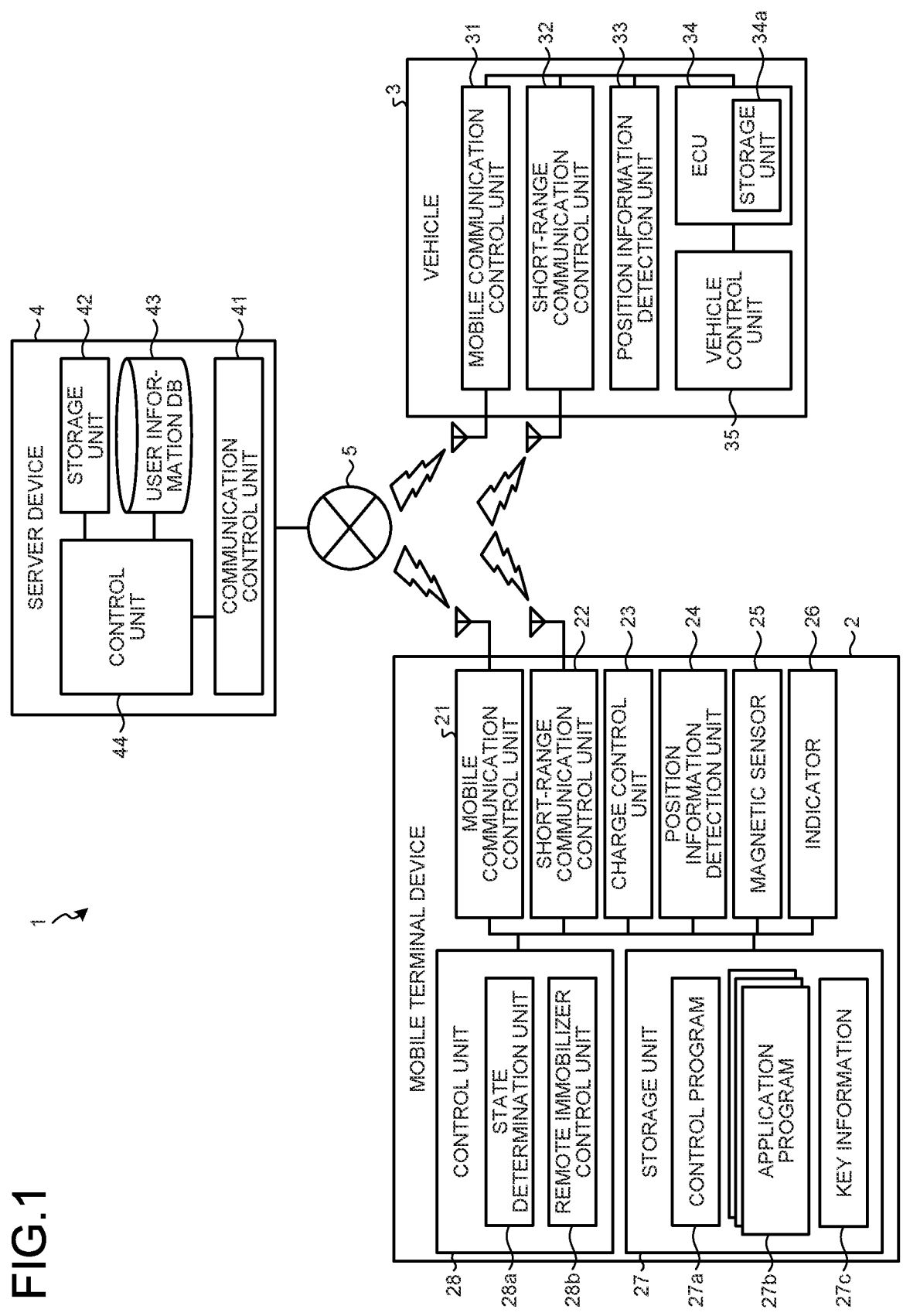
FIG. 1 is a block diagram illustrating a configuration of a vehicle control system according to an embodiment.

FIG. 1 is a block diagram illustrating a configuration of the vehicle control system according to the embodiment. As illustrated in FIG. 1, a vehicle control system 1 according to the embodiment includes a mobile terminal device 2, a vehicle 3, and a server device 4, and the mobile terminal device 2, the vehicle 3, and the server device 4 may perform information communication with each other via a telecommunication line 5 such as an Internet line network or a mobile phone line network.

The mobile terminal device 2 functions as a key device. The mobile terminal device 2 includes a device capable of performing information communication with the vehicle 3 and the server device 4, such as a smartphone and a smart key, and is possessed by a user who owns the vehicle 3. In the present embodiment, the mobile terminal device 2 includes a mobile communication control unit 21, a short-range communication control unit 22, a charge control unit 23, a position information detection unit 24, a magnetic sensor 25, an indicator 26, a storage unit 27, and a control unit 28.

The mobile communication control unit 21 includes a communication circuit for information communication via the telecommunication line 5, and controls information communication with the vehicle 3 and the server device 4 via the telecommunication line 5. Specifically, the mobile communication control unit 21 modulates a signal to be transmitted into a frequency band of the telecommunication line 5 and transmits the modulated signal, and when receiving a signal in the frequency band of the telecommunication line 5, demodulates the signal.

The short-range communication control unit 22 includes an electronic circuit having an information communication function conforming to a standard such as near field radio communication (NFC), Bluetooth (registered trademark) low energy (BLE), or infrared Data Association (IrDA), and controls short-range wireless communication with the vehicle 3. Specifically, the short-range communication control unit 22 modulates a signal to be transmitted and transmits the modulated signal to the vehicle 3, and when receiving a signal from the vehicle 3, demodulates the signal.

The charge control unit 23 is a device that controls charging operation of a secondary battery such as a battery provided in the mobile terminal device 2 by an external power source.

The position information detection unit 24 includes a device that detects position information of the mobile terminal device 2 by receiving radio waves from a global positioning system (GPS) satellite, and outputs, to the control unit 28, an electric signal indicating the detected position information of the mobile terminal device 2.

The magnetic sensor 25 includes a magnetic sensor capable of detecting a direction of geomagnetism in three axis directions, for example, and outputs, to the control unit 28, an electric signal indicating the detected direction of geomagnetism. By using the magnetic sensor 25, for example, it is possible to determine whether or not the mobile terminal device 2 is in a stationary state.

The indicator 26 lights and blinks in accordance with a control signal from the control unit 28, thereby presenting operation states of the smart key function and the remote immobilizer function to a user. Thus, the user may confirm the operation states of the smart key function and the remote immobilizer function any time.

The storage unit 27 includes a recording medium such as an erasable programmable read only memory (EPROM), a hard disk drive (HDD), and a removable medium. Examples of the removable medium include a universal serial bus (USB) memory and a disc recording medium such as a compact disc (CD), a digital versatile disc (DVD), and a Blu-ray (registered trademark) disc (BD). The storage unit 27 stores various computer programs and various types of control data necessary for operation of the mobile terminal device 2. In the present embodiment, the storage unit 27 stores a control program 27a and various application programs 27b that are computer programs, and key information 27c used for the smart key function.

The control unit 28 includes a processor including a central processing unit (CPU), a digital signal processor (DSP), and a field-programmable gate array (FPGA), and a main storage unit including a random access memory (RAM) and a ROM. The control unit 28 loads a computer program stored in the storage unit 27 in a work area of the main storage unit and executes the computer program to control each component of the mobile terminal device 2. In the present embodiment, the control unit 28 loads the control program 27a stored in the storage unit 27 in the work area of the main storage unit, and executes the control program 27a to function as a state determination unit 28a and a remote immobilizer control unit 28b. Functions of the state determination unit 28a and the remote immobilizer control unit 28b will be described later.

The vehicle 3 includes a well-known vehicle such as an electric vehicle (EV), a hybrid vehicle (HV), or a fuel cell electric vehicle (FCEV), and includes a mobile communication control unit 31, a short-range communication control unit 32, a position information detection unit 33, an electric control unit (ECU) 34, and a vehicle control unit 35.

The mobile communication control unit 31 includes a communication circuit for information communication via the telecommunication line 5, and controls information communication with the mobile terminal device 2 and the server device 4 via the telecommunication line 5. Specifically, the mobile communication control unit 31 modulates a signal to be transmitted into a frequency band of the telecommunication line 5 and transmits the modulated signal, and when receiving a signal in the frequency band of the telecommunication line 5, demodulates the signal.

The short-range communication control unit 32 includes an electronic circuit having an information communication function conforming to a standard such as NFC, BLE, or IrDA, and controls short-range wireless communication with the mobile terminal device 2. Specifically, the short-range communication control unit 32 modulates a signal to be transmitted and transmits the modulated signal to the mobile terminal device 2, and when receiving a signal from the mobile terminal device 2, demodulates the signal.

The position information detection unit 33 includes a device that detects position information of the vehicle 3 by receiving radio waves from a GPS satellite, and outputs, to the ECU 34, an electric signal indicating the detected position information of the vehicle 3. Note that, as a method of detecting position information of the vehicle 3, a method combining light detection and ranging or laser imaging detection and ranging (LiDAR) and a three-dimensional digital map may be adopted.

The ECU 34 includes a processor including a CPU, a DSP, and a FPGA, and a storage unit 34a including a RAM and a ROM. The ECU 34 executes a computer program stored in the storage unit 34a to comprehensively control operation of various components mounted on the vehicle 3. In the present embodiment, the ECU 34 authenticates the mobile terminal device 2 by collating the key information 27c transmitted from the mobile terminal device 2 with key information 27c stored in the storage unit 34a, and when the mobile terminal device 2 is authenticated, controls the vehicle control unit 35 to unlock or lock a door of the vehicle 3. In addition, the ECU 34 controls the vehicle control unit 35 in response to receiving a setting signal or a stop signal for the remote immobilizer function from the server device 4, thereby prohibiting or permitting starting of an engine of the vehicle 3.

The vehicle control unit 35 controls operation of various components mounted on the vehicle 3 in accordance with control signals from the ECU 34. In the present embodiment, the vehicle control unit 35 controls locking and unlocking of the door of the vehicle 3 in accordance with a control signal from the ECU 34. In addition, the vehicle control unit 35 prohibits or permits starting of the engine of the vehicle 3 in accordance with a control signal from the ECU 34.

The server device 4 includes an information processing apparatus such as a workstation, and includes a communication control unit 41, a storage unit 42, a user information database (user information DB) 43, and a control unit 44.

The communication control unit 41 includes a communication circuit for information communication via the telecommunication line 5, and controls information communication with the mobile terminal device 2 and the vehicle 3 via the telecommunication line 5. Specifically, the communication control unit 41 modulates a signal to be transmitted into a frequency band of the telecommunication line 5 and transmits the modulated signal, and when receiving a signal in the frequency band of the telecommunication line 5, demodulates the signal.

The storage unit 42 includes a recording medium such as an EPROM, an HDD, and a removable medium. The storage unit 42 stores various computer programs and various types of control data necessary for operation of the server device 4.

The user information DB 43 stores unique identification information assigned to the mobile terminal device 2 possessed by a user and unique identification information assigned to the vehicle 3 owned by the user in association with each other.

The control unit 44 includes a processor including a CPU, a DSP, and a FPGA, and a main storage unit including a RAM and a ROM. The control unit 44 loads a computer program stored in the storage unit 42 in a work area of the main storage unit and executes the computer program to control each component of the server device 4.

In the vehicle control system 1 having such a configuration, the mobile terminal device 2 controls setting or stopping of the remote immobilizer function by executing setting processing and stop processing to be described below, so that the remote immobilizer function may be used without requiring complicated work. Hereinafter, operation of the mobile terminal device 2 when executing the setting processing and the stop processing will be described with reference to FIGS. 2 and 3.

Figure 2:
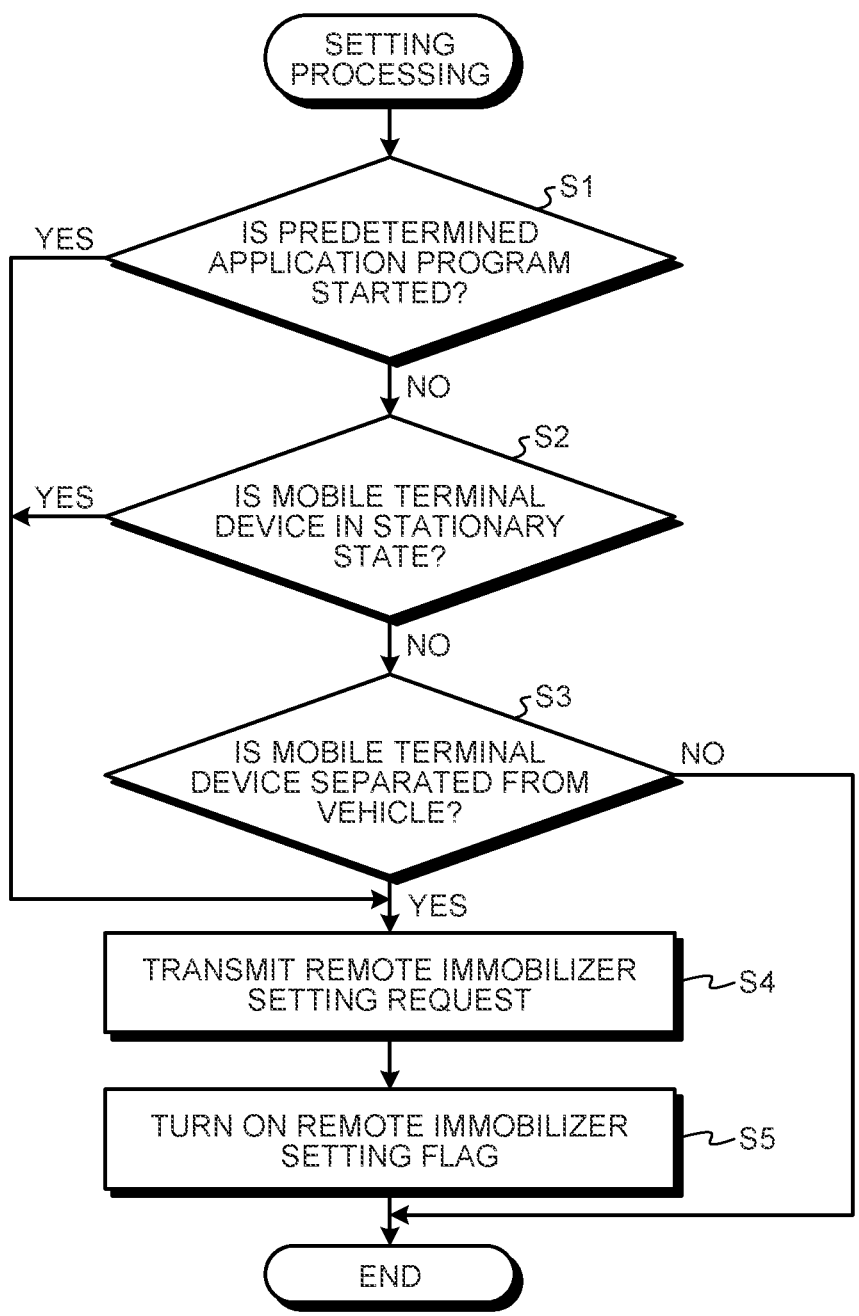
FIG. 2 is a flowchart illustrating a flow of setting processing according to the embodiment.

FIG. 2 is a flowchart illustrating a flow of the setting processing according to the embodiment. The flowchart illustrated in FIG. 2 starts when a state of a remote immobilizer function setting flag indicating whether or not the remote immobilizer function is set is in an off state indicating that the remote immobilizer function is not set, and the setting processing proceeds to processing of Step S1. While the state of the remote immobilizer function setting flag is in the off state, this setting processing is repeatedly executed every time a predetermined time elapses after an end of previous setting processing.

In the processing of Step S1, the state determination unit 28a determines whether or not a predetermined application program unrelated to operation of the vehicle 3 is started among the application programs 27b stored in the storage unit 27. Whether or not a predetermined application program unrelated to operation of the vehicle 3 is started may be determined by, for example, preparing a table indicating a type of each application program in advance, and by determining, by the state determination unit 28a, whether or not a type of an application program loaded in the work area of the main storage unit of the control unit 28 is related to operation of the vehicle 3 with reference to the table. Examples of the predetermined application program unrelated to operation of the vehicle 3 may include an application program related to sleep and/or cooking.

As a result of the determination, when a predetermined application program unrelated to operation of the vehicle 3 is started (Step S1: Yes), the state determination unit 28a advances the setting processing to processing of Step S4. On the other hand, when a predetermined application program unrelated to operation of the vehicle 3 is not started (Step S1: No), the state determination unit 28a advances the setting processing to processing of Step S2.

In the processing of Step S2, the state determination unit 28a determines whether or not the mobile terminal device 2 is in a stationary state on the basis of an electric signal output from the magnetic sensor 25. As a result of the determination, when the mobile terminal device 2 is in the stationary state (Step S2: Yes), the state determination unit 28a advances the setting processing to the processing of Step S4. On the other hand, when the mobile terminal device 2 is not in the stationary state (Step S2: No), the state determination unit 28a advances the setting processing to processing of Step S3.

In the processing of Step S3, first, the state determination unit 28a acquires position information of the vehicle 3 from the server device 4 via the telecommunication line 5. Specifically, in response to receiving an acquisition request of the position information from the mobile terminal device 2, the server device 4 reads, from the user information DB 43, identification information of the vehicle 3 associated with identification information of the mobile terminal device 2 included in the acquisition request. Then, the server device 4 acquires, from the position information detection unit 33 of the vehicle 3 corresponding to the read identification information, the position information of the vehicle 3, and transmits the acquired position information to the mobile terminal device 2.

Next, the state determination unit 28a determines whether or not the mobile terminal device 2 is separated from the vehicle 3 by a predetermined distance or more by comparing the position information of the vehicle 3 with position information of the mobile terminal device 2 detected by the position information detection unit 24. As a result of the determination, when the mobile terminal device 2 is separated from the vehicle 3 by a predetermined distance or more (Step S3: Yes), the state determination unit 28a advances the setting processing to the processing of Step S4. On the other hand, when the mobile terminal device 2 is not separated from the vehicle 3 by a predetermined distance or more (Step S3: No), the state determination unit 28a ends a series of the setting processing.

In the processing of Step S4, the remote immobilizer control unit 28b transmits a setting request signal for the remote immobilizer function to the server device 4 via the telecommunication line 5. In response to receiving the setting request signal for the remote immobilizer function from the mobile terminal device 2, the server device 4 reads, from the user information DB 43, the identification information of the vehicle 3 associated with the identification information of the mobile terminal device 2 included in the setting request signal. Then, the server device 4 sets the remote immobilizer function by communicating with the vehicle 3 corresponding to the identification information read via the telecommunication line 5. Thus, the processing of Step S4 is completed, and the setting processing proceeds to processing of Step S5.

In the processing of Step S5, the remote immobilizer control unit 28b sets the state of the remote immobilizer function setting flag to an on state indicating that the remote immobilizer function is set. Then, the remote immobilizer control unit 28b sets a state of the indicator 26 to a state indicating that the remote immobilizer function is set. Thus, the processing of Step S5 is completed, and the series of the setting processing ends.

Figure 3:
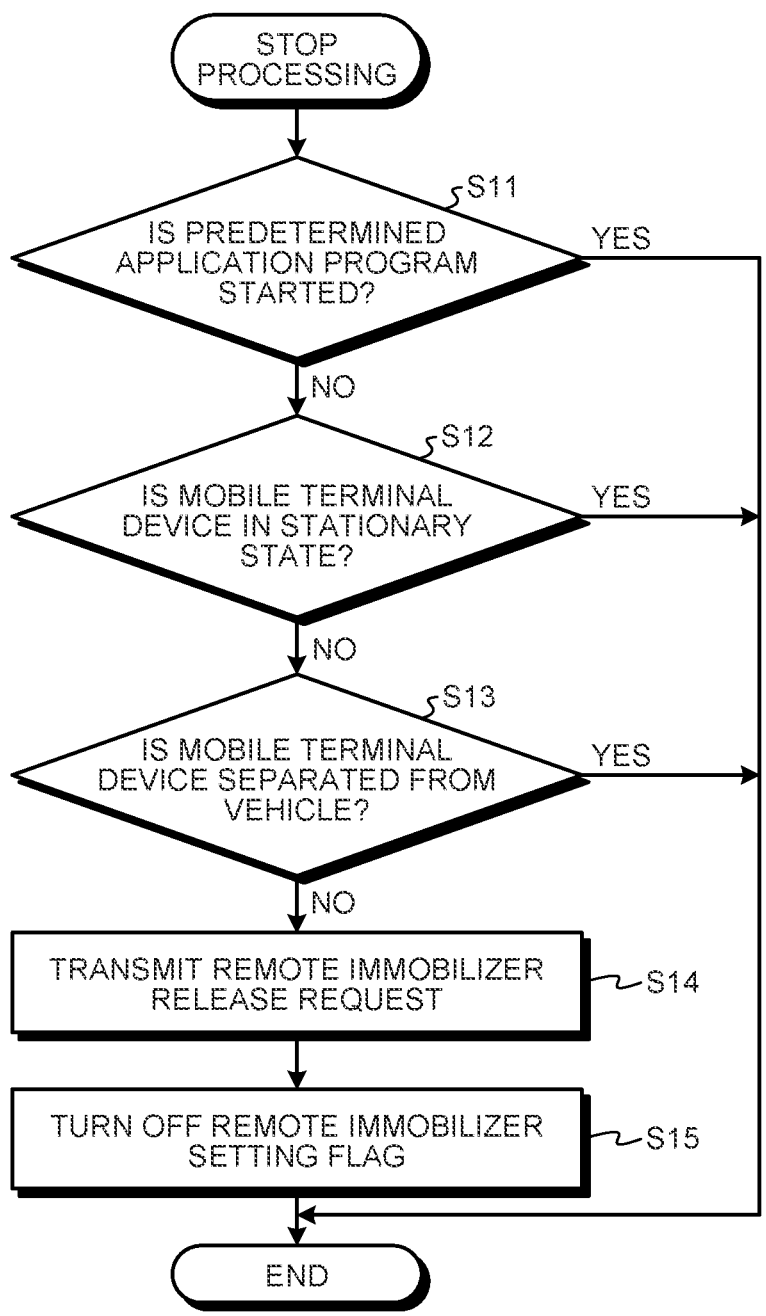
FIG. 3 is a flowchart illustrating a flow of stop processing according to the embodiment.

FIG. 3 is a flowchart illustrating a flow of the stop processing according to the embodiment. The flowchart illustrated in FIG. 3 starts when the state of the remote immobilizer function setting flag is in the on state, and the stop processing proceeds to processing of Step S11. While the state of the remote immobilizer function setting flag is in the on state, this stop processing is repeatedly executed every time a predetermined time elapses after an end of previous stop processing.

In the processing of Step S11, the state determination unit 28a determines whether or not a predetermined application program unrelated to operation of the vehicle 3 is started among the application programs 27b stored in the storage unit 27. As a result of the determination, when a predetermined application program unrelated to operation of the vehicle 3 is started. (Step S11: Yes), the state determination unit 28a ends a series of the stop processing. On the other hand, when a predetermined application program unrelated to operation of the vehicle 3 is not started (Step S11: No), the state determination unit 28a advances the stop processing to processing of Step S12.

In the processing of Step S12, the state determination unit 28a determines whether or not the mobile terminal device 2 is in a stationary state on the basis of an electric signal output from the magnetic sensor 25. As a result of the determination, when the mobile terminal device 2 is in the stationary state (Step S12: Yes), the state determination unit 28a ends the series of the stop processing. On the other hand, when the mobile terminal device 2 is not in the stationary state (Step S12: No), the state determination unit 28a advances the stop processing to processing of Step S13.

In the processing of Step S13, the state determination unit 28a acquires position information of the vehicle 3 from the server device 4 via the telecommunication line 5. Then, the state determination unit 28a determines whether or not the mobile terminal device 2 is separated from the vehicle 3 by a predetermined distance or more by comparing the position information of the vehicle 3 with position information of the mobile terminal device 2 detected by the position information detection unit 24. As a result of the determination, when the mobile terminal device 2 is separated from the vehicle 3 by a predetermined distance or more (Step S13: Yes), the state determination unit 28a ends the series of the stop processing. On the other hand, when the mobile terminal device 2 is not separated from the vehicle 3 by a predetermined distance or more (Step S13: No), the state determination unit 28a advances the stop processing to processing of Step S14.

In the processing of Step S14, the remote immobilizer control unit 28b transmits a release request signal for the remote immobilizer function to the server device 4 via the telecommunication line 5. In response to receiving the release request signal for the remote immobilizer function from the mobile terminal device 2, the server device 4 reads, from the user information DB 43, identification information of the vehicle 3 associated with identification information of the mobile terminal device 2 included in the release request signal. Then, the server device 4 stops the remote immobilizer function by communicating with the vehicle 3 corresponding to the identification information read via the telecommunication line 5. Thus, the processing of Step S14 is completed, and the stop processing proceeds co processing of Step S15.

In the processing of Step S15, the remote immobilizer control unit 28b sets the state of the remote immobilizer function setting flag to the off state. Then, the remote immobilizer control unit 28b sets the state of the indicator 26 to a state indicating that the remote immobilizer function is stopped. Thus, the processing of Step S15 is completed, and the series of the stop processing ends.

As is obvious from the above description, in the vehicle control system 1 according to the embodiment, the control unit 28 determines whether or not the state of the mobile terminal device 2 is in a predetermined state requiring setting of the remote immobilizer function, and when the state of the mobile terminal device 2 is in the predetermined state, transmits a setting request signal for the remote immobilizer function to the server device 4, and when the state of the mobile terminal device 2 is not in the predetermined state, transmits a stop request signal for the remote immobilizer function to the server device 4. Thus, a user may use the remote immobilizer function without requiring complicated work, and as a result, security against a relay attack may be improved.

Note that, in the present embodiment, the control unit 28 determines whether or not the state of the mobile terminal device 2 is in a predetermined state and turns on/off the remote immobilizer function. However, the server device 4 may determine whether or not the state of the mobile terminal device 2 is in a predetermined state by detecting information regarding the state of the mobile terminal device 2 via the telecommunication line 5 and turn on/off the remote immobilizer function.

According to the present disclosure, a remote immobilizer function may be used without requiring complicated work.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle control apparatus comprising a processor comprising hardware, the processor being configured to:
   determine whether or not a state of a key device includes at least one predetermined state requiring a setting of a remote immobilizer function prohibiting starting of an engine of a vehicle, the at least one predetermined state including a state in which an application program unrelated to operation of the vehicle is started on the key device; and
   transmit, in response to a determination that the state of the key device includes any state of the at least one predetermined state, a first signal requesting the setting of the remote immobilizer function.

2. The vehicle control apparatus according to claim 1, wherein the processor is further configured to transmit a second signal requesting a stop of the remote immobilizer function in response to a determination that the state of the key device does not include any state of the at least one predetermined state.

3. The vehicle control apparatus according to claim 1, wherein the at least one predetermined state further includes a state in which the key device is connected to a charger.

4. The vehicle control apparatus according to claim 1, wherein the at least one predetermined state further includes a state in which the key device is stationary.

5. The vehicle control apparatus according to claim 1, wherein the at least one predetermined state further includes a state in which the key device is separated from the vehicle by at least a predetermined distance.

6. The vehicle control apparatus according to claim 1, wherein the processor is further configured to output information indicating whether or not the remote immobilizer function is set.

7. A vehicle control system comprising:
   a vehicle;
   a key device comprising a first processor comprising hardware; and
   a server comprising a second processor comprising hardware,
   wherein the first processor is configured to:
      determine whether or not a state of the key device includes at least one predetermined state requiring a setting of a remote immobilizer function prohibiting starting of an engine of a vehicle, the at least one predetermined state including a state in which an application program unrelated to operation of the vehicle is started on the key device, and
      transmit to the server, in response to a determination that the state of the key device includes any state of the at least one predetermined state, a first signal requesting the setting of the remote immobilizer function, and
   wherein the second processor is configured to set the remote immobilizer function by communicating with the vehicle in response to receiving the first signal.

8. The vehicle control system according to claim 7,
wherein the first processor is further configured to transmit, to the server, a second signal requesting a stop of the remote immobilizer function in response to a determination that the state of the key device does not include any state of the at least one predetermined state, and wherein the second processor is further configured to stop the remote immobilizer function by communicating with the vehicle in response to receiving the second signal.

9. The vehicle control system according to claim 7, wherein the at least one predetermined state further includes a state in which the key device is connected to a charger.

10. The vehicle control system according to claim 7, wherein the at least one predetermined state further includes a state in which the key device is stationary.

11. The vehicle control system according to claim 7, wherein the at least one predetermined state further includes a state in which the key device is separated from the vehicle by at least a predetermined distance.

12. The vehicle control system according to claim 7, wherein the first processor is further configured to output information indicating whether or not the remote immobilizer function is set.

13. A non-transitory computer-readable recording medium on which an executable program is recorded, the program causing a processor of a computer to execute operations of:
determining whether or not a state of a key device includes at least one predetermined state requiring a setting of a remote immobilizer function prohibiting starting of an engine of a vehicle, the at least one predetermined state including a state in which an application program unrelated to operation of the vehicle is started on the key device; and transmitting, in response to a determination that the state of the key device includes any state of the at least one predetermined state, a first signal requesting the setting of the remote immobilizer function.

14. The non-transitory computer-readable recording medium according to claim 13, wherein the program further causes the processor to execute an operation of transmitting a second signal requesting a stop of the remote immobilizer function in response to a determination that the state of the key device does not include any state of the at least one predetermined state.

15. The non-transitory computer-readable recording medium according to claim 13, wherein the at least one predetermined state further includes a state in which the key device is connected to a charger.

16. The non-transitory computer-readable recording medium according to claim 13, wherein the at least one predetermined state further includes a state in which the key device is stationary.

17. The non-transitory computer-readable recording medium according to claim 13, wherein the at least one predetermined state further includes a state in which the key device is separated from the vehicle by at least a predetermined distance.

* * * * *